United States Patent [19]

Belil Creixell

[11] Patent Number: 4,951,791
[45] Date of Patent: Aug. 28, 1990

[54] REAR WHEEL SUSPENSION MECHANISM FOR MOTORCYCLES AND THE LIKE VEHICLES

[76] Inventor: Jose L. Belil Creixell, C. Homer, 40, 08023 Barcelona, Spain

[21] Appl. No.: 154,990

[22] Filed: Feb. 10, 1988

[30] Foreign Application Priority Data

| | | |
|---|---|---|
| Feb. 20, 1987 [ES] | Spain | 8700720 |
| May 22, 1987 [ES] | Spain | 8701502 |
| Oct. 23, 1987 [ES] | Spain | 8703028 |
| Nov. 17, 1987 [ES] | Spain | 8703269 |
| Nov. 25, 1987 [ES] | Spain | 8703350 |

[51] Int. Cl.$^5$ .............................. B62K 25/10
[52] U.S. Cl. .................... 180/219; 180/227; 280/284
[58] Field of Search ........... 280/283, 284, 285, 288; 180/219, 227, 231

[56] References Cited

U.S. PATENT DOCUMENTS

| | | | |
|---|---|---|---|
| 3,817,342 | 6/1974 | Hamilton | 180/227 |
| 3,917,313 | 11/1975 | Smith et al. | 280/284 |
| 4,058,181 | 11/1977 | Buell | 180/227 |
| 4,114,918 | 9/1978 | Lutz | 180/227 |

Primary Examiner—Mitchell J. Hill
Attorney, Agent, or Firm—Steinberg & Raskin

[57] ABSTRACT

A rear wheel suspension mechanism for a rear-wheel drive motorcycle or the like includes at least two longitudinally extending oscillating arms, an oscillating axle support articulated to a first end of each of the oscillating arms at respective first joints, second ends of the oscillating arms being articulated to respective points of the vehicle frame at respective second joints. The first joints and the axis of a first sprocket coupled to the rear drive wheel constitutes apices of a first virtual triangle, while the second joints and the axis of rotation of a second sprocket mounted at the output of a gear box constitute apices of a second virtual triangle, the first and second virtual triangles being substantially congruent and similarly oriented at all times. In this manner, the transmission coupling the first and second sprockets, such as a transmission chain, gear arrangement, or the like, will not become loose or too tight or misaligned during operation. Two of the first and second joints may be moveable while maintaining the first and second ends of the arms articulated to the axle support and motorcycle frame respectfully to provide for continuous adjustment of the distance between the first and second joints formed by each of the oscillating arms.

11 Claims, 10 Drawing Sheets

REAR WHEEL SUSPENSION MECHANISM FOR MOTORCYCLES AND THE LIKE VEHICLES

BACKGROUND OF THE INVENTION

The present invention relates to improvements in the rear wheel suspension mechanism for motorcycles and like vehicles, advantageously for such motorcycles comprising a driving sprocket at the output of the gearbox, connected by means of a roller transmission chain to a sprocket or gear wheel which is integral with the axle of the rear driving wheel, the axle being journaled in a support related to the oscillating system of the rear wheel. As will be seen in the course of the present specification, the improvements are applicable, as well, to motorcylces provided with a transmission made of a shaft and toothed gearings.

When a motorcycle is made to effect a sudden acceleration (the conventional transmission arrangement from the gearbox output sprocket to the sprocket mounted on the rear wheel axle supported by the oscillating ensemble) a force resolution takes place which tends to raise the vehicle rear wheel, with a corresponding loss of stability during the acceleration.

With the aim of overcoming the above problem, the applicant devised two kinds of transmissions for motorcyles making the subject of the Spanish utility models No. 293,283 and No. 293,573 relating to respective motorcycle transmissions incorporating mechanism intended to obtain, upon a sudden acceleration arising, a force moment on the swing axle of the oscillating ensemble articulated to the motorcycle frame, tending to move the said frame towards the floor over which the motorcycle runs.

It has been observed, in practice, that the force moment obtained with the transmission arrangements masking the subject of the above utility models is excessive and sometimes even of a negative effect. In fact, when the motorcycle runs over an irregular floor, a stiffness effect of the rear driving wheel suspension arises which can lead to a chain rupture.

SUMMARY OF THE INVENTION

The improvements making the subject of the present invention provide for a neutralization of the force moments arising with the sudden accelerations in a motorcycle, with a rather neutral than upward directed force moment, and with an ability for adjusting on the oscillating ensemble of the rear driving wheel, a force moment tending to apply it onto the floor in a regulatable manner.

The improvements constituting the subject of the invention essentially consist of an oscillating support articulated to the ends of at least two oscillating arms placed in longitudinal direction as regards the motorcycle traveling direction; an axle for the rear driving wheel mounted in the oscillating support and having secured thereto at one of their ends the sprocket or gear wheel receiving the motion from the transmission roller chain meshing with the gearbox output sprocket; the opposite ends of the oscillating arms being articulated to respective points of the motorcycle frame placed above, under or coinciding with the center line of the gearbox output sprocket; such that the oscillating arms constitute, together with the rear wheel axle oscillating support, an oscillating ensemble in the shape of at least an articulated polygon.

In an advantageous embodiment all of the jointing points of the articulated polygon are of movable location in order to provide for adjustment of all of the distances between the points. It has been foreseen that the articulated polygon is an articulated parallelogram the oscillating arms of which are parallel to the virtual line passing through the center lines of the sprockets or gearwheels over which the transmission roller chain meshes; it is possible for the arms to be located under, over or coinciding with the said center lines. According to a more specific embodiment, the jointing points of the articulated parallelogram to the support carrying the driving wheel axle, are aligned as regards the axle. Likewise, the jointing points of the articulated parallelogram to the motor cycle frame are aligned with the center line of the gearbox output sprocket, whereas it is also possible that the linking points of the oscillating arms are not aligned with the center lines of the driving rear wheel or the gearbox output sprocket.

It has also been foreseen that the oscillating arms may be linked with one antoehr by transversal struts in turn linked to a third oscillating arm constituting the support of the driving wheel axle and being adjustable as regards the motion direction of the motorcycle and of any desired length.

According to another aspect of the instant improvements, the transfer of the rotation motion of the gearbox output sprocket to the driving rear wheel is performed by means of a rigid shaft, with no intermediate universal joint, connected at its ends to the gearbox output sprocket and the gear wheel integral with the driving rear wheel axle by respective gearwheel sets, preferably bevel gear sets.

Advantageously, all of the jointing points of the articulated polygon members are of variable location such as to provide for adjustment of the distances between the said points.

In a specific embodiment, the rear wheel axle is mounted on an oscillating support articulated to the ends of at least two oscillating arms located in longitudinal direction as regards the motion direction of the motorcycle, whereas the opposite ends of the said oscillating arms are jointed to respective points of the motorcycle frame, placed over and/or under the center line of the gearbox output sprocket.

Optionally, the articulated polygon is an articulated parallelogram the oscillating arms of which are parallel to the transmission shaft and located under, over or at the same heigh of the transmission shaft. They may, even, be substituted by this latter.

In a further specific embodiment, the jointing points of the articulated parallelogram to the support carrrying the rear driving wheel axle may be aligned as regards the said axle, and the jointing points of the articulated parallelogram to the motorcycle frame are aligned as regards the center line of the gearbox output sprocket or, alternatively, they may form like triangles at both ends.

It is also provided for the two longitudinal arms being connected with one another by struts in turn articulated to a third arm constituting the support for the rear driving wheel axle, the jointing points of the said arms forming articulated parallelograms.

At least the oscillating arms of the articulated polygon constituting the osciallating ensemble, are formed of at least two mutually extensible and adjustable sections with means for adjusting and securing the desired mutual position. Preferably, the rear end of the oscillating arms are jointed to a smaller, cranked arm associated with the rear driving wheel axle, whereas the forward ends of the over and, or under the gearbox output shaft, such that the said jointing points and axles are not aligned and located at the apices of virtual like front and rear triangles with like or different sides. The end of one oscilating arm, jointed to the motorcycle frame, extends forwards and carries, jointed directly through cams, one end of a shock-absorber the opposite end of which is articulated to the other oscillating arm at a point located rearward of the jointing point of the arm to the motorcycle frame; the rear cranked arm carrying the motorcycle rear wheel carries the shoe or block of the brake for the said wheel. At least one end of the oscillating arms is connected within respective bushings having screws which are operable from the outside to regulate the extension of the respective arms and secure the assumed position, with the cooperation of safety nuts.

The oscillating arms of the articulated polygon located at one or both sides of the motorcycle and constituting the oscillating ensemble of the rear wheel, are articulated with one another by means of transversal arms in turn articulated to a third arm constituting the support for the driving wheel axle, the length of this support-arm being such that either point of the said support-arm remains at the same distance as regards the center line of the gearbox output sprocket regardless of the position of the oscillating ensemble.

Advantageously, the jointing points of either oscillating arm to the motorcycle frame and the struts constitute the apices of respective virtual and like triangles, the sides of one triangle being parallel to the homologous sides of the other. The jointing points of the oscillating arms to the motorcycle frame and the center line of the gearbox output sprocket constitute the apices of a virtual traingle which is identical with the virtual triangles formed by the jointing points of the arms with the struts and the jointing points of each of these with the support for the driving wheel.

In an advantageous embodiment, the front ends of the oscillating arms have respective extensions from the jointing points to the frame, the extension of one arm being connected to the extension of the opposite arm by means of respective cross-arranged shock absorbers of combined actions.

The invention contemplates also the case in which the motion transmission is formed of roller chain and sprockets, and in such instances the axle of the driving wheel is mounted adjustable in the longitudinal direction as regards the motion direction of the motorcycle.

According to the improvements making the subject of the present invention, a secondary transmission is inserted between at least one of the sprockets connected to the motorcycle transmission, either chain or rigid shaft, and the axle of the driving wheel or the gearbox output axle, such that the center lines of the sprockets connected to the transmission constitute one of the apices of respective virtual and like triangles, the other apices being formed by the jointing points of the oscillating ensemble arms.

BRIEF DESCRIPTION OF THE DRAWINGS

For a better understanding of the present specification, the enclosed exemplary drawings show a practical embodiment of the suspension for motorcycles incorporating the improvements of the invention. In the drawings.

DESCRIPTION OF PREFERRED EMBODIMENTS

Figure 1:
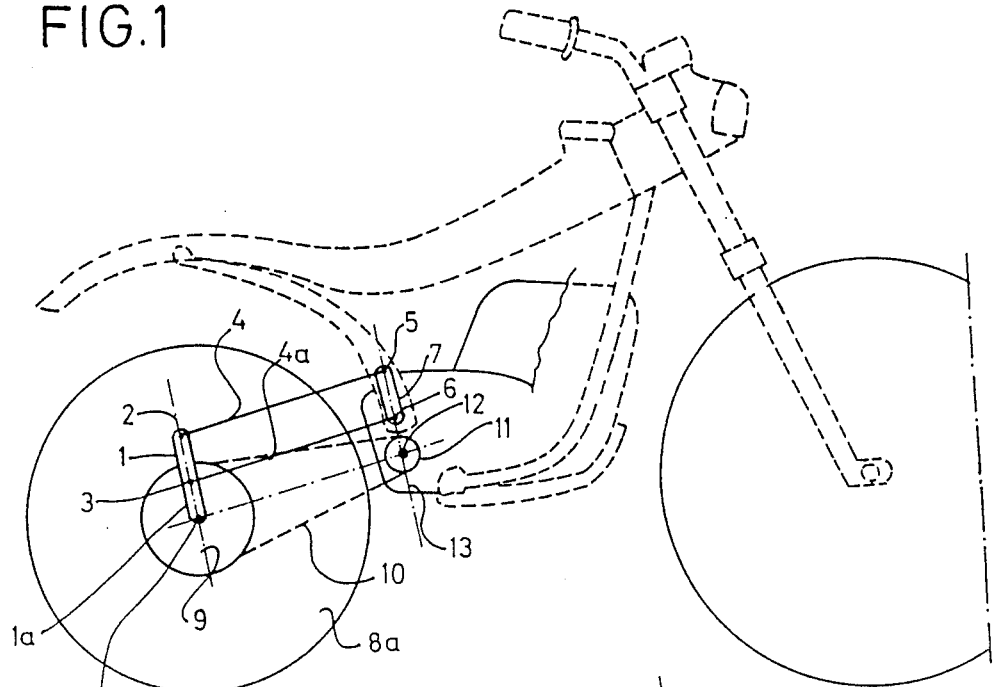
FIG. 1 is an schematic lateral elevation of the suspension mechanism for motorcycles making the subject of the invention, with chain-and-gear transmission.
Figure 2:
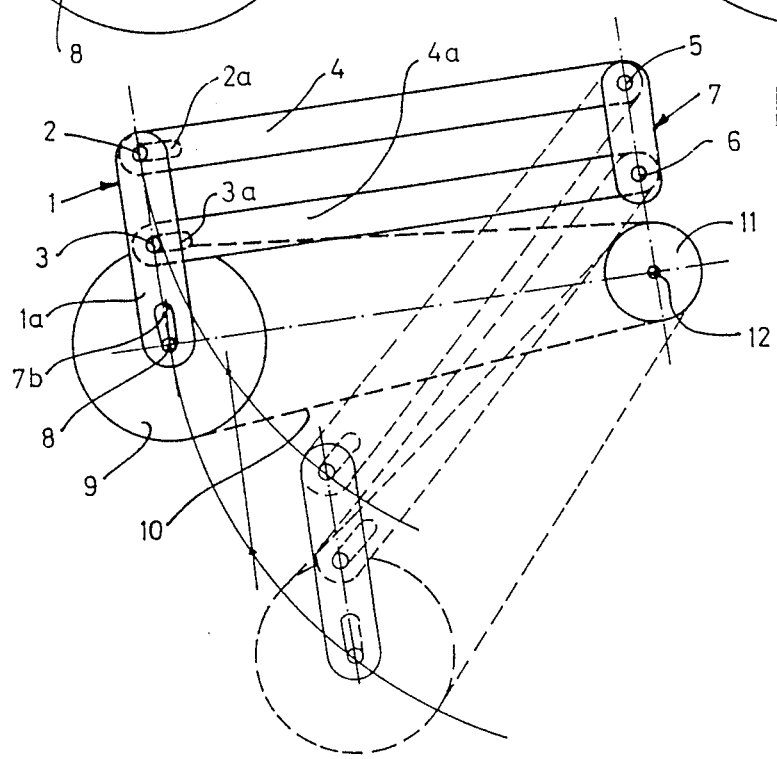
FIG. 2 is a schematic view, at a larger scale, of the suspension mechanism, wherein the suspension motion is shown in dotted lines.
Figure 3:
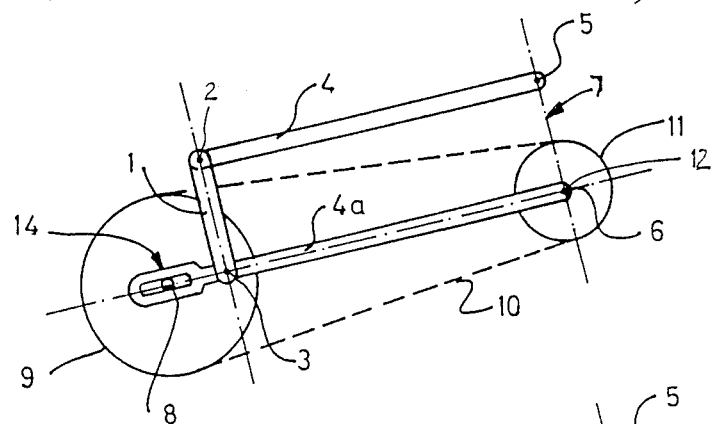
FIGS. 3 to 7 are respective schematic elevation views corresponding to respective examples of embodiments of the invention.
Figure 4:
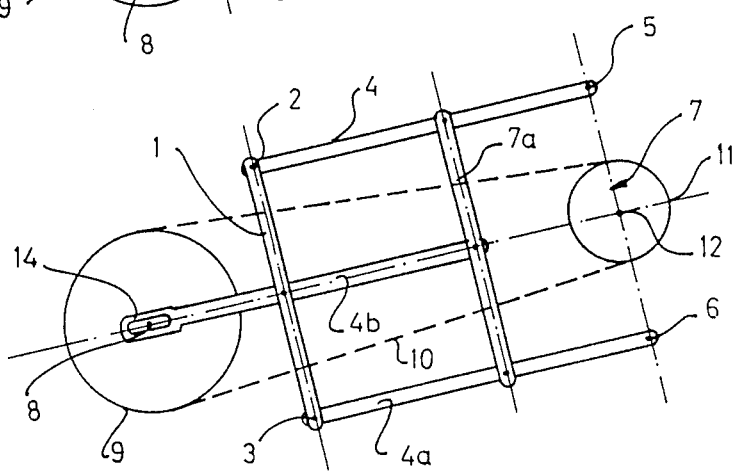
Figure 5:
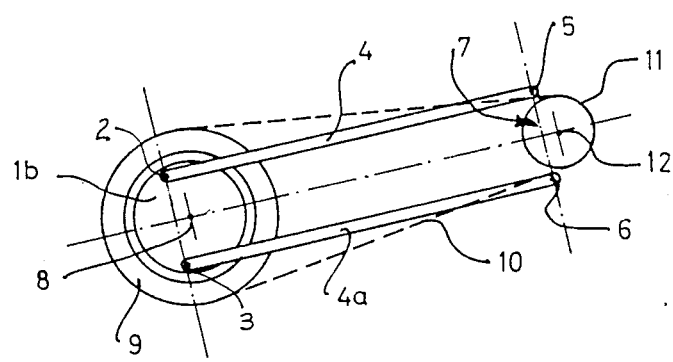
Figure 6:
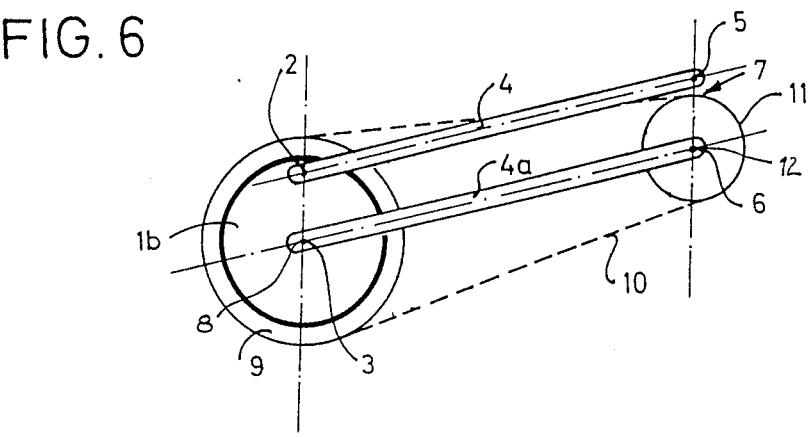

A rear wheel suspension for motorcycles and the like vehicles comprises, according to the invention, in the version including a roller chain transmission shown in FIG. 1 to 7, a support denoted with the reference numeral 1 in the shape of an arm, or whatever other shape, such as the brake drum 1b (FIG. 5 and 6), having articulated at points 2 and 3 one of the ends of at least two arms 4, 4a. The opposite ends of these arms are jointed at points 5, 6 of a section of the motorcycle frame, diagrammatic shown in the drawings by a part 7 that may have the more suitable shape according to the specific features of the motorcycle. FIGS. 3 and 6 provided for the points 6 being coincident with the axle 12 of the sprocket 11. In FIG. 6 the point 3 coincides with the center line 8 of the sprocket 9 of wheel 8a.

It is also to be noted that the jointing points of arms 4, 4a are not aligned with the center lines 8, 12 in the version according to FIG. 5.

Thus, it may be assumed that the jointing points of the arms are just those defining the formation of the articulated parallelogram regardless of the shape of the arms and the parts associated thereto for affixing their positions.

The ensemble of the hitherto described parts constitute an articulated polygon that may be formed of an articulated parallelogram, as in the example shown, yet it may assume whatever other shape, for example trapezial or trapezoid-shaped, according to the distances of between the pairs of jointing points 2,3; 5,6; 2,5; and 3,6, for a purpose to be explained later on. In FIG. 3 and 4 provision is made for the adjustable chain stretchers 14 for adjusting the position of the wheel and the sprocket 9. In FIG. 3 the chain stretcher is located at the end of the arm 4a passing through the points 3 and 6. FIG. 4 shows an example having theree longitudinal swinging arms 4,4a, 4b, as well a cross, strut 7a, besides arm 1, the arms 4 and 4a being over and under, respectively, the output shaft 12 of the gearbox 13. In this example, the arm 4b constitutes the support for the axle 8 of the driving wheel 9 and its position coincides, advantageously, with a line passing through the axles 8 and 12. The support arm 4b may be of whatever lenght.

Support 1 extends from one of the jointing points 2 or 3 (point 3 in the example shown) forming a section 1a that carries mounted thereon the axle 8 of the driving wheel 8a having secured as well a sprocket 9 over which a transmission roller chain 10 meshes, coming from a further sprocket 11 mounted on the output shaft 12 of the motorcycle gearbox 13.

According to a non-exclusive, possible version of the improvements according to the invention, the jointing points 2 and 3 of arms 4 and 4a to the support 1, may be moved closer or farther to the jointing points 5 and 6 by a conventional stretching device, as graphically shown by the oblong openings 2a, 3a extending in the longitudinal direction of the arms. Of course, points 2 and 3 will be associated with conventional means for locating and securing them at the desired positions within the said oblong apertures.

On the other hand, axle 8 of the rear wheel 8a and the sprocket 9 may be, optionally, mounted more or less apart from the jointing point 3 by means of a conventional stretching device. This feasibility has been shown in FIG. 2 by means of an oblong aperture 7b extending in the longitudinal direction as regards the support 1. Like in the case of points 2 and 3, optional means may be arranged on the axle 8 for placing and securing it at the desired location as regards the longitudinal aperture 7b. It must be remembered that, as indicated above, shaft 8 may coincide with the jointing point 3 (FIG. 6).

It is also possible to optionally change the positions of the jointing points 5 and 6 in a similar way as in the case of points 2 and 3, and the positions of the axle 12 more or less like in the case of axle 8, Although the FIGS. show an ensemble of articulated parallelogram placed at one side of the motorcycle, this ensemble could be doubled, one at either side of the same. It is also possible to have more than two articulated arms between the support 1 and the section 7 of the frame, thus forming several articulated polygons (FIG. 4).

Figure 7:
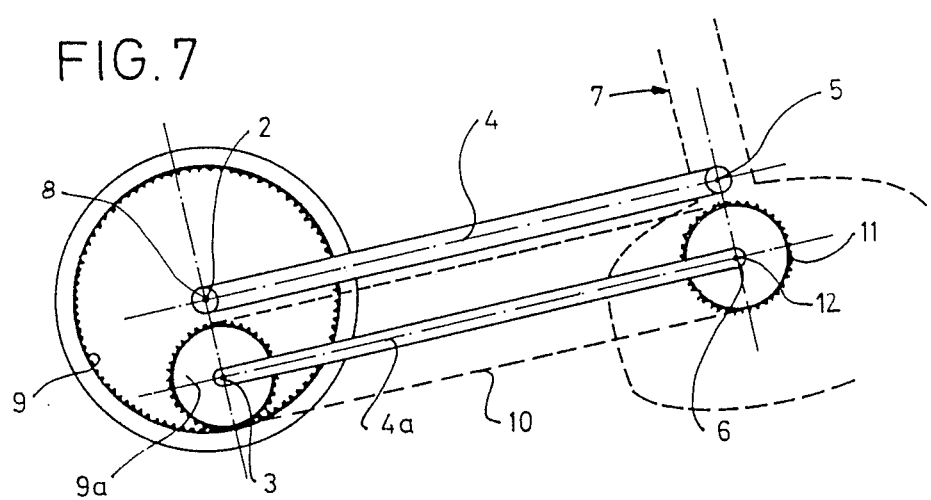
Figure 8:
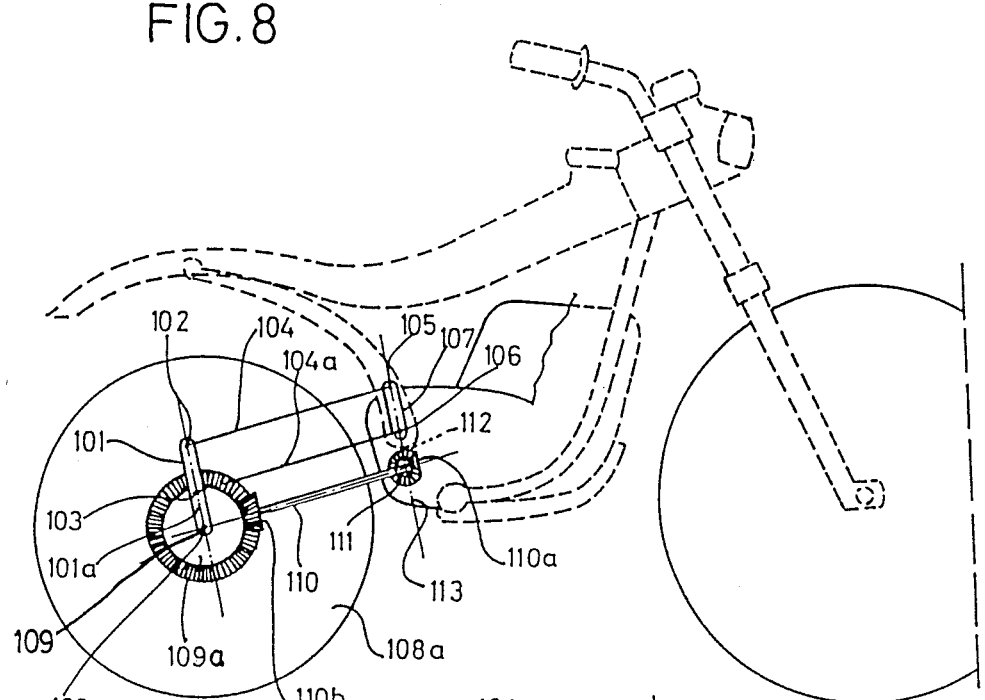
FIG. 8 is a schematic view in side elevation of the transmission and oscillating ensemble for motorcycles with shaft and sprocket transmission.

FIG. 7 shows an example similar to that of FIG. 6, except for the roller chain 10 meshing with an ihtermediate sprocket 9a which in turn meshed with another sprocket (not shown) engaged with the gear wheel 9 secured to the shaft 8 of wheel 8a.

From the above and looking to the drawings, it is inferred that the improvements according to the invention are based on obtaining at least one articulated polygon, advantageously an articulated paralellogram having one side formed by the support 1 with the extension 1a carrying the axle 8 for the driving wheel 8a and the sprocket 9; whereas the side opposite to this latter is constituted by the section 7 joined to the motorcycle frame, both sides being connected by two or more articulated arms 4 and 4a. This articulated parallelogram or polygon makes up the swinging ensemble of the rear wheel and the corresponding transmission sprocket, with the purpose of keeping constant the distance between the axles 8 and 12 and neutralizing the effects of the sudden accelerations or decelerations of the engine, thus holding constant the length of the chain 10 and getting the associated shock absorber free to perform its function.

When the swinging ensemble is to be applied to motorcycles intended to be run on uneven grounds, such as trail or cross-motorcycles, the articulated polygon is located over the axles 8, 12 as in the example shown. When the swinging ensemble is devoted to motorcycles intended to be run on scarely uneven grounds, the articulated polygon is located under the said axles.

The ability of changing the position of points 2, 3 and 8 allows the articualated polygon to be given different shapes (trapezial, trapezoidal) with different inclines of its sides, in order to adapt the swinging ensemble to specific applications. The drawings show the neutral version in which the articulated polygon is a parallelogram, point 2, 3 and 8 are aligned with one another, as well as point 5, 6 and 12 with one another. By changing the shape of the articulated polygon, it is possible to obtain a variation of the force component generated by the accelerations or decelerations of the engine, which is throughly regulatable and controllable, either as regards the direction or the intensity of this component.

In the version of FIGS. 8 to 15 the transmission comprises a support 101 in the shape of an arm or whatever other shape, such as the brake drum 101b (FIG. 12 and 13), bearing articulated at points 102, 103 one end of at least two arms 104, 104a. The opposite ends of these arms are articulated to points 105, 106 of a section of the motorcycle frame which, in the drawings, is schematically shown by a part 107 that may have the more suitable form according to the specific features of the motorcycle.

An axle 108 for the driving wheel 108a is mounted on the support 101 and carries a toothed crown, advantageously a bevel crown, as in the embodiments shown in FIGS. 8 to 13, receiving the rotation motion from a rigid transmission shaft 110 which requires no universal joint and has an one end a bevel sprocket 110a meshing with the bevel sprocket 111 mounted on the output shaft 112 of the gearbox 113. The opposite end of the transmission shaft 110 carries a further bevel sprocket 110b directly meshing with the toothed bevel crown 109a, or else with an intermediate sprocket in turn meshing with the crown 109b, as in the case shown in FIGS. 14 and 15.

Figure 10:
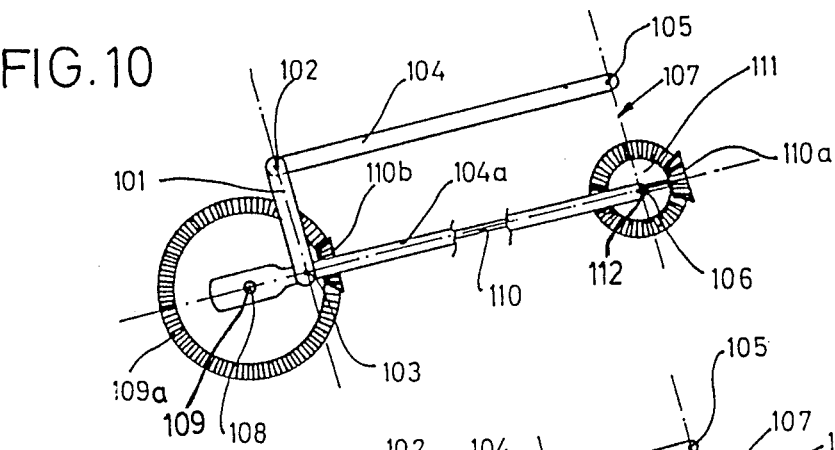
FIGS. 10 to 15 are respective schematic elevation views corresponding to respective examples of embodiments of the invention, according to the version of FIG. 8.
Figure 13:
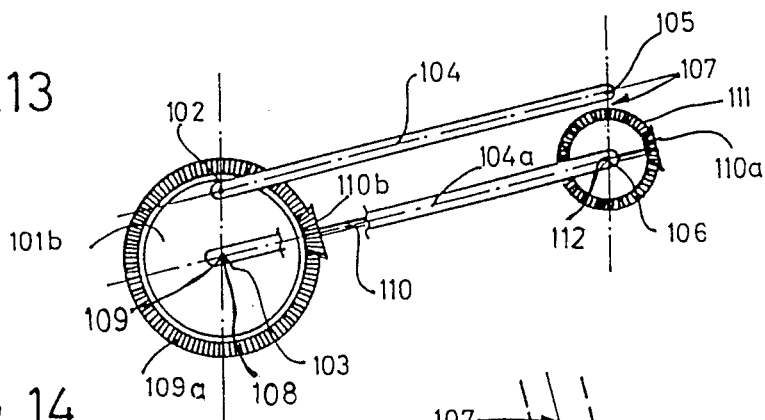
Figure 14:
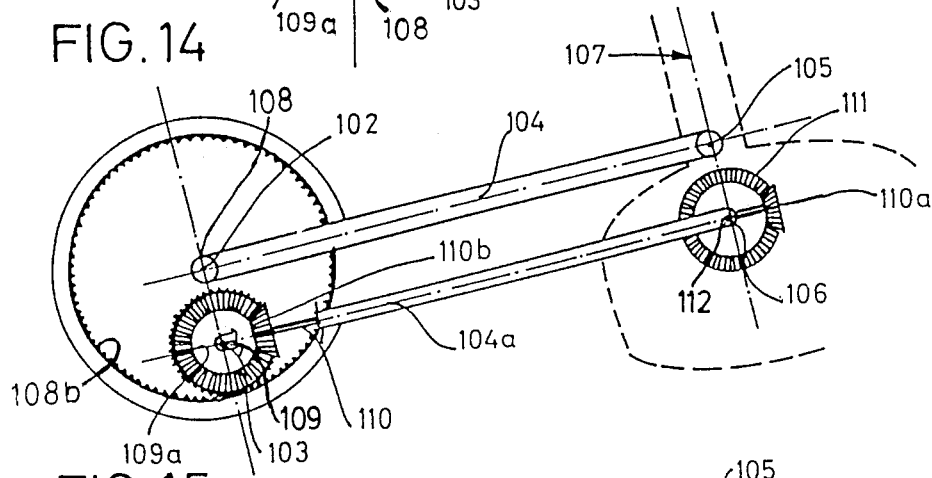

In FIGS. 10 and 13 and 14 provision is made for the points 106 to be coincident with the axle 112 of the sprocket 111. In FIGS. 13 and 14 the point 103 coincides withe axle 109 of the sprocket 109a for the wheel 108a.

Figure 9:
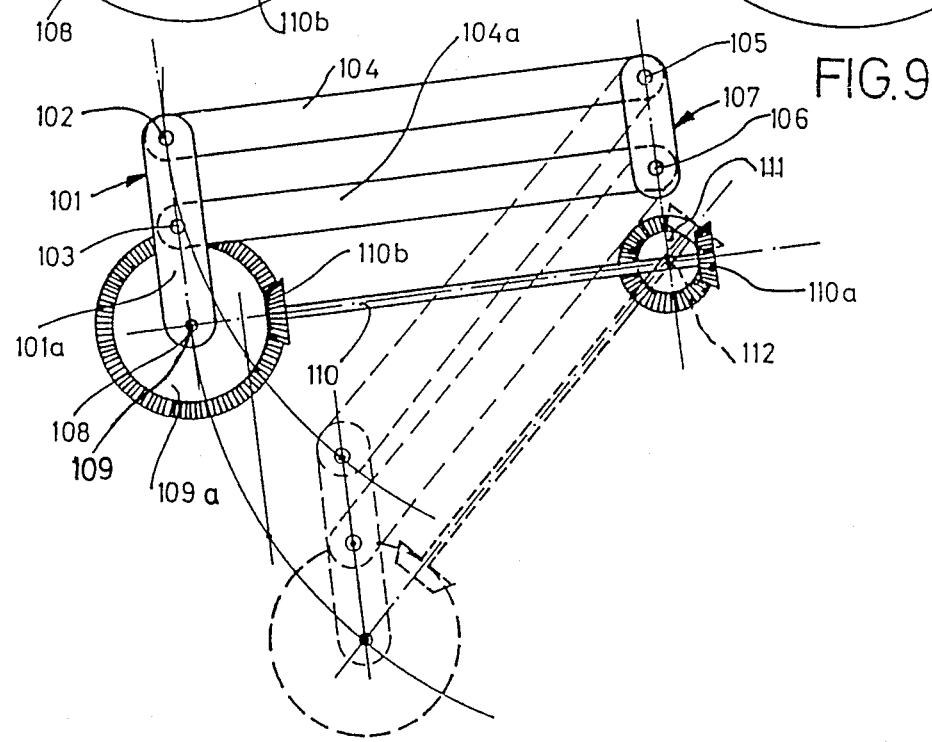
FIG. 9 is a schematic view at a larger scale of the transmission and oscillating ensemble, the motion of this latter being shown in dotted lines.
Figure 12:
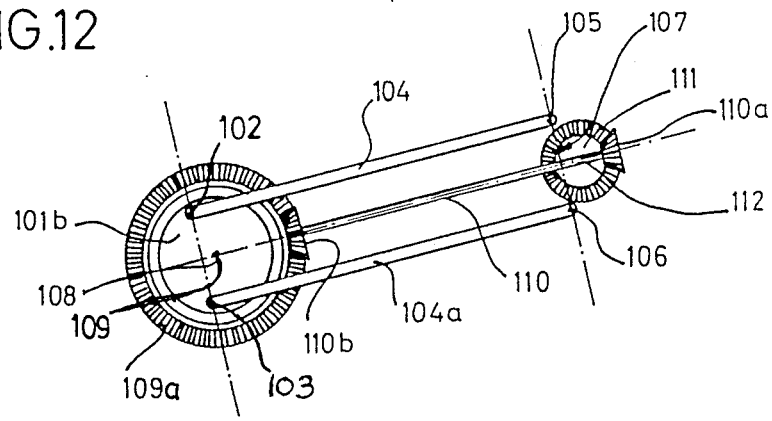

FIG. 9 shows an example wherein the jointing points 102, 103 are aligned with the axle 109, while the jointing points 105, 106 are aligned with the axle 112. In FIG. 12 these points are located at the apices of respective like triangles the sides of which may be equal or different.

It is thus assumed that the jointing points 102, 103 ad 105, 106 of the arms 104, 104a, just those which define the articulated parallelogram regardless of the shaped of the arms and of the associated parts to secure the position therefor.

Figure 11:
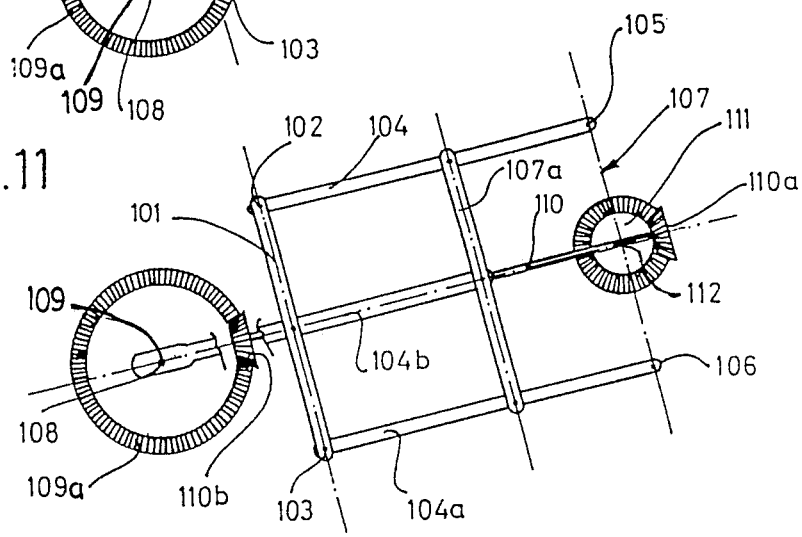

The ensemble of components described until now constitute an articulated polygon that may be formed of an articulated parallelogram as in the example shown. FIG. 11 shows an example having three longitudinal arms 104, 104a, 104b as well as two transverse struts 101, 107a, the arms of 104 and 104a being located respectively over and under the gearbox output shaft 112. In this example, the arm 104b constitutes the support for the driving wheel axle 108. This support arm 104b may be of any desired length. The jointing points between the members 104, 104a, 101 and 107a constitute articulated parallelogram.

Figure 15:
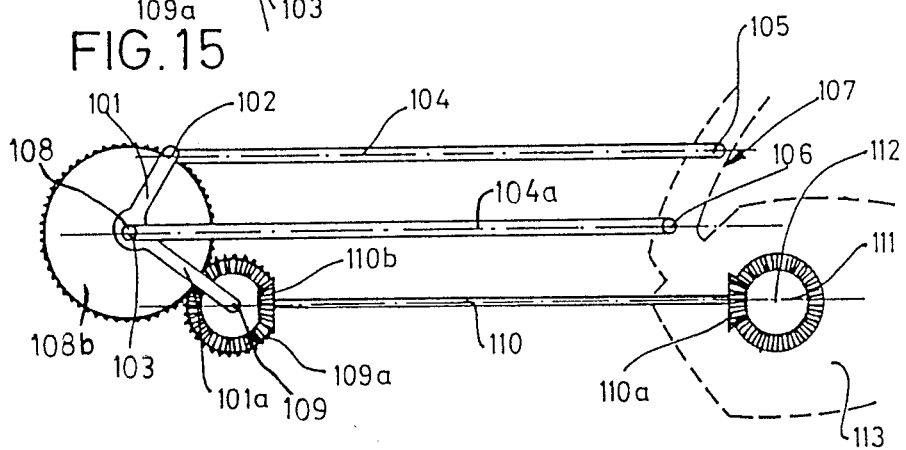

The support 101 extends from one of the its articulation points 102 or 103, from point 103 in the example shown, in a section 101a upon which the axle 109 for the sprocket 109a is mounted (FIG. 9 and 15).

As indicated, the axle 109 may coincide with the jointing point 103 (FIG. 13 and 14).

Although the drawing show an ensemble of elements forming an articulated parallelogram placed at one side of the motorcycle, this ensemble may be double by placing one such ensemble at either side of the motorcyle. It is also possible to use more than two articulated arms between the support 101 and the frame section 107, thus forming more than one articulated polygon (FIG. 11).

In FIGS. 14 and 15 the sprocket 110b of the transmission shaft 110 meshes with a sprocket 109a which meshes in turn with the crown 108b, thereby to shown several non-restrictive examples of the use of an intermediate gear between the transmission shaft sprocket and the crown secured to the driving wheel axle.

From the above described and FIGS. 8 to 15 OF the drawings, it will be seen that the invention provides for incorporating to the motorcycle a rigid transmission shaft without the need for mounting a universal or articulated joint (such as a Cardan joint), owing to the adoption of the kind of swinging suspension with articulated parallelogram as described. This articulated parallelogram or polygon, which makes up the swinging suspension for the rear wheel, keeps constant the distance between the axles 109 and 112 regardless of the position of the suspension ensemble, so that the sprockets 110a and 110b keep always in mesh with the respective sprocket 111 and sprocket or crown 109a while they move about them according to the movements of the parallelogram (FIG. 9) and dispensing with the use of articulated joints. It is obvious that the absense of any articulated joint, besides of simplifying the transmission, reduces the breakdown risk and makes sturdier the transmission, together with the possibility of closing the ensemble within a protecting box that prevents entrance of dust and dirt and optimizes the lubrication condition, such that a motorcycle provided with the improvements becomes ideal to be run over rough grounds. Furthermore, the swinging suspension ensemble neutralizes the effects of sudden accelerations or decelerations at the driving wheel, and at the same time sets the associated shock absorber free for performing its action.

When the swinging ensemble is applied to motorcycles intended to be run over rough grounds, such as trail and cross-motorcycles, the articulated polygon may be located over the axles 109, 112, as in the example shown. When the swinging ensemble is to be used in motorcycles which are to be run over rather even grounds, the articulated polygon my be placed under the said axle.

Figure 16:
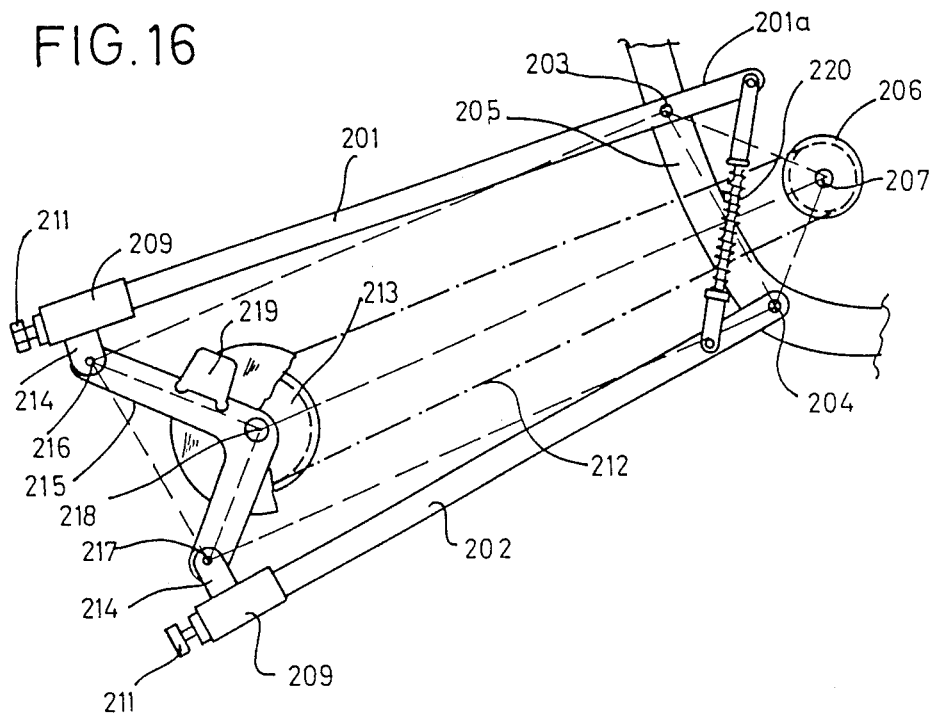
FIG. 16 is a schematic view in side elevation of a rear suspension ensemble with extensible and adjustable longitudinal oscillating or swinging arms.
Figure 17:
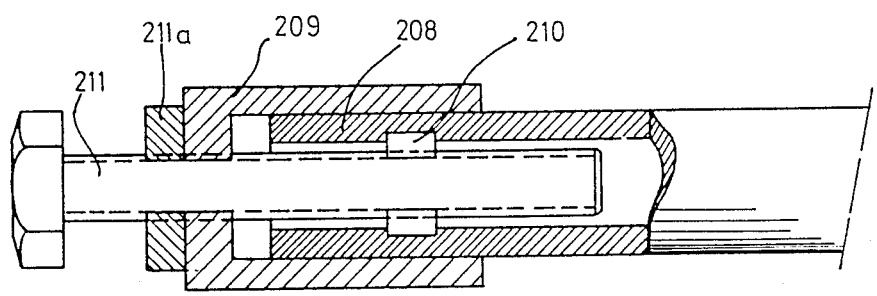
FIG. 17 is a detail in longitudinal section at larger scale of one end of swinging arm fitted within a bushing with means for adjusting and securing the more or less extended position of the arm.

FIGS. 16 and 17 of the drawings show a version of the invention in which the articulated polygon constituting the swinging ensemble is formed of two longitudinal arms 201,202 with their forward ends articulated to respective points 203, 204 of the motorcycle frame 205, over and under the gearbox output sprocket 206 mounted on a shaft 207, thus forming a virtual triangle of apices 203, 204, 207 the sides of which may be like or different.

The rear ends 208 of arms 201, 202 are mounted in adjustable position within respective bushings 209. The ends 208 have an internal nut 210 (FIG. 17) into which a coaxial screw 211 is threadedly engaged and has a head which is operable from outside to extend more or less the corresponding longitudinal arm, and adapt the same to the specific needs to either side and provide for stretching the transmission chain 212 going from the gearbox output sprocket to the rear sprocket 213. The assumed position is locked by means of a safety nut 211a.

The bushings 209 have lugs 214 articulated to the end of a crank arm 215 about axles 216, 217 located respectively over and under the axle 218 of the motorcycle rear wheel, thus forming a virtual triangle the apices of which correspond to the axle 216, 217 and 218.

The crank arm 215 carries secured thereon the shoe or block 219 of the motorcycle rear wheel brake.

The front end of arm 201 has an extension 201a carrying articulated one end of a shock absorber 220, the opposite end of which is articulated on the arm 202, at a point located somewhat rearward (FIG. 16).

As it appears from the above description and the drawings (FIGS. 16 and 17), owing to the extensible configuration of the longitudinal arms 201, 202, it is feasible to accurately adjust the length of these arms by operation of the screws 211, according to the specific needs of either case and to the desired stretching of the chain, without a need for complicated setting operations.

Another advantage derive from the described embodiment. is the possibility of giving the chain 212 and the transmission in general, an integral protection becoming very suitable for motorcycles intended to be run on dusty or muddy tracks.

It is to be emphasized the action of the shock absorbers 220 which are extremely active in absorbing the sudden accelerations and brakings, thus cooperating to obtain a greater fit of the rear wheel onto the floor, thus improving the stability of the motorcycle.

It is important that the lines passing through the points 216 and 203 on the one hand and 217 and 204 on the other, are parallel with one another and with the line joining the 218 and 207, as well as of the same length. The length of the sides of the virtual and like triangles with their apices at the points 203, 204, 207; 216, 217, 218 is, however, optional. It should be underlined the fact that the jointing points of arms 201, 202 are not aligned withe axles 207 or 218, according to which front or rear jointing point is considered, thus giving a greater versatility to the swinging ensemble structure.

Thus, the rear wheel drive includes a rear or first sprocket 213 mounted at the rear drive wheel which rotates about a first axis 218 and a forward or second sprocket 206 mounted at the gear box output which rotates about a second axis 207, and a transmission chain 212 coupling the first and second sprockets. The suspension for the rear wheel drive comprises the substantially longitudinally extending arms 201, 202 and the axle support 215 in the shape of a crank arm articulated to a first end of each arm at first joints 216, 217 and which supports the rear wheel axle which also rotates about axis 218. The ends of arms 201, 202 opposite from the first ends are articulated to the motorcycle frame at second joints 203, 204.

According to the invention, a first virtual triangle having first joint 216, 217 and the first sprocket axis 218 as its apices, and a second virtual triangle having second joints 203, 204 and the second sprocket axis 207 as its apices are alike each other, i.e., the two triangles are substantially congruent and oriented the same as each other at all times as the motorcycle rear wheel oscillates.

Figure 18:
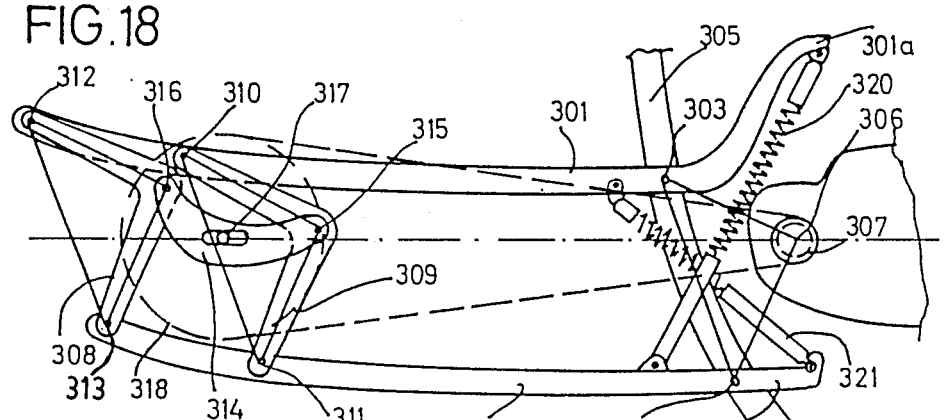
FIG. 18 is a schematic view in side elevation of the swinging ensemble as applied to a motorcycle with roller chain and sprocket transmission, with the swinging arms connected with one another by means of transverse struts.
Figure 19:
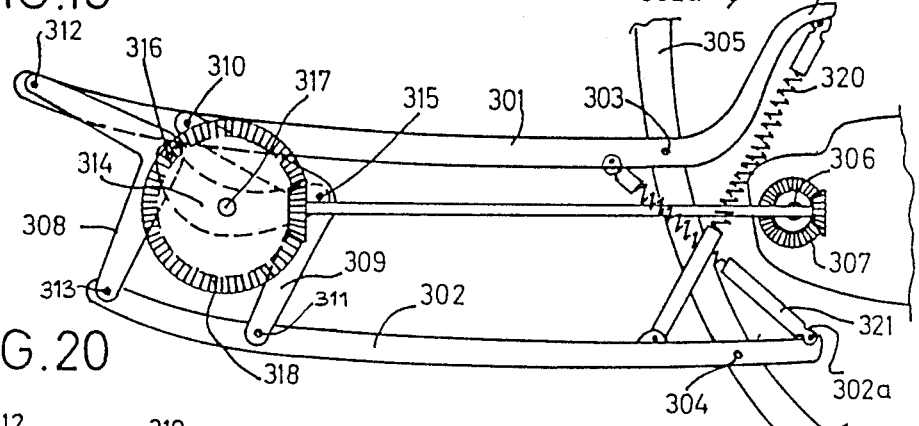
FIG. 19 is a view similar to the previous one, but with the swinging ensemble being applied to a motorcycle with rigid-shaft, joint-less transmission, provided with terminal sprockets respectively meshing with the gearbox output sprocket and the motorcycle driving wheel sprocket.
Figure 20:
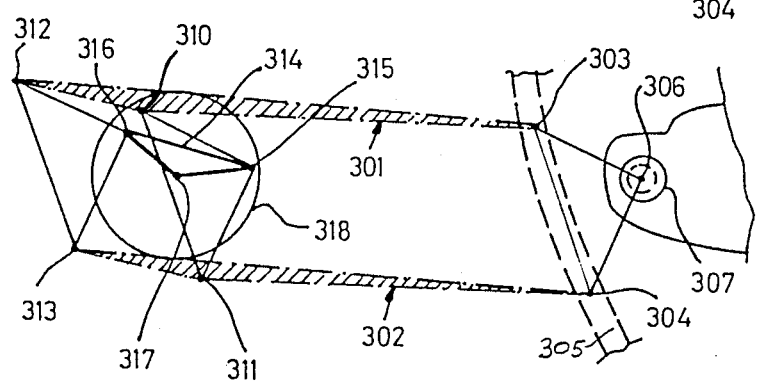
FIG. 20 is a schematic view of the ensemble of arms and jointing points compounding the swinging ensemble according to the versions of FIGS. 18 and 19.

The improvements comprise, according to the version shown in FIGS 18 to 20 of the drawings, comprise two longitudinal arms 301, 302 with one of their ends jointed at points 303, 304 of the motorcycle frame 305, these points constituting, together with the output shaft 306 of the gearbox sprocket 307, constitute the apices of a virtual triangle.

In turn, the arms 301, 302 are connected with one another by transverse struts 308, 309, which may be elbowed, at points 310, 311 and 312, 313. These elbowed or cranked arms are jointed at points 315, 316 to a third arm or support 314 supporting the axle 317 for the driving wheel sprocket 318. If the motorcycle transmission is made up of a roller chain (FIG. 18), the axle 317 is arranged in longitudinally adjustable position by means of any conventional device, which permits to stretch the chain meshing about the sprockets 307, 318.

Advantageously the arms 301, 302 have respective forward extensions 301a, 302a which are connected with either opposite arm by means of mutually crossed shock absorbers 320, 321 of combined actions, preferably behind the, or at the jointing points to the frame.

The described ensemble of arms and shock absorbers may be double, with one ensemble located at either side of the motorcycle, symmetrically as regards the median longitudinal plane of this latter.

It should be underlined the position of the jointing points 303 and 304 forming a virtual triangle together with the axle 306. Likewise, the jointing points 310, 311, 315 on the one hand, and 312, 313, 316 on the other, form respective virtual triangles, equal with one another and to the triangle defined by points 303, 304, 306, also parallel and equally spaced apart.

The distance of between the points 306, 315 and 306, 316 remains constant, and, as a consequence, any point 317 jointed at 315 and 316 remains equidistant to the shaft 306, regardless of the swinging ensemble position.

It is also important to remark that points 303, 310, 312 constitute the apices of a virtual triangle which is identical to the virtual triangle formed by the points 304, 311, 313, the said triangles having their sides always parallel independently of the swinging ensemble position. Two sides of this triangle may be formed of a single elbowed arm 301 or 302, as in the example shown in FIG. 18.

Owing to the specific arrangement of the swinging ensemble making the subject of the improvements shown in FIG. 18 to 20, it is attained that for constant rpm or accelerations at the output sprocket, always constant rpm or accelerations are obtained at the driving wheel, regardless of the swinging movements of the said swinging ensemble, which means an important advantage in connection with the roadholding of the driving wheel, in comparison with the conventional swinging ensembles, which do not hold these constants.

The presence of the combined action shock absorbers 320, 321 provides for a widening of the course performed by the swinging ensemble, without the driving wheel coming, with the motorcycle at still and idling, to the lowermost point of its course.

Also, when the running motorcycle jumps from one point to another and the driving wheel becomes suspended, this latter does not drop too much, thus preventing its striking against intermediate obstacles.

Another advantage presented by the shock absorber ensemble making the subject of the invention, resides on the fact that the motorcycle, when running over very rough grounds, returns to its optimal position easier and without suddenness or rebounding, or oscillations produced by the driving wheel inertial forces.

Figure 21:
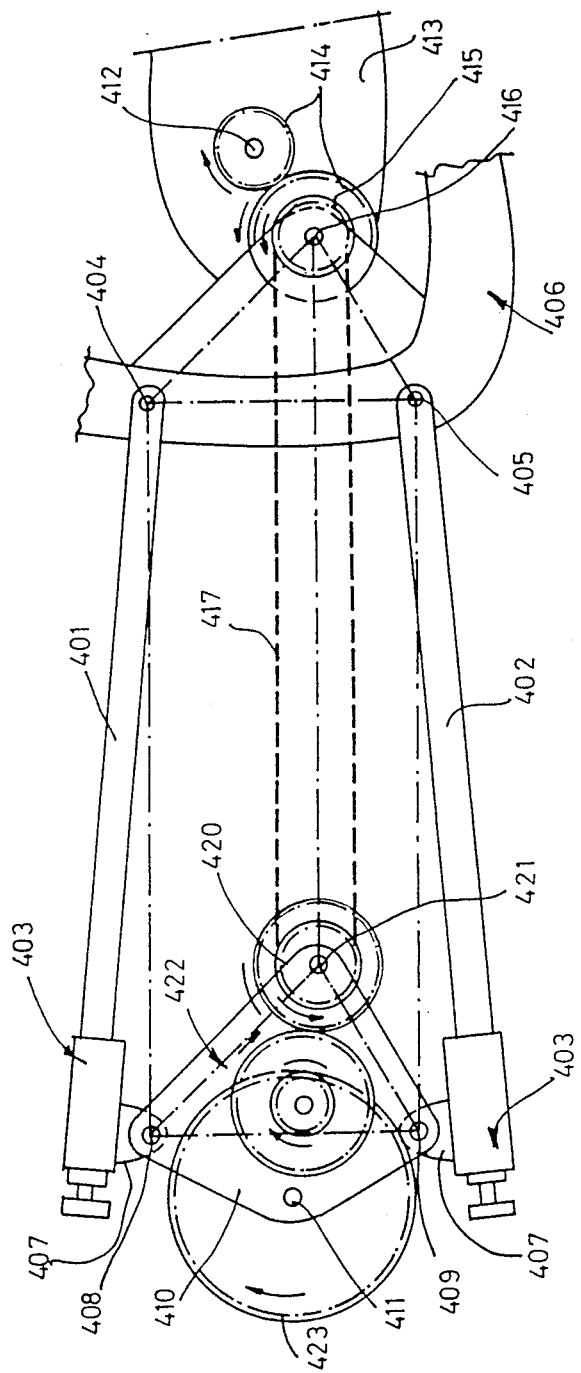
FIG. 21 is a view in side elevation of an embodiment of the invention incorporating sprocket gearing at both ends of a roller chain transmission for a motorcycle having a swinging ensemble formed of an articulated parallelogram.
Figure 22:
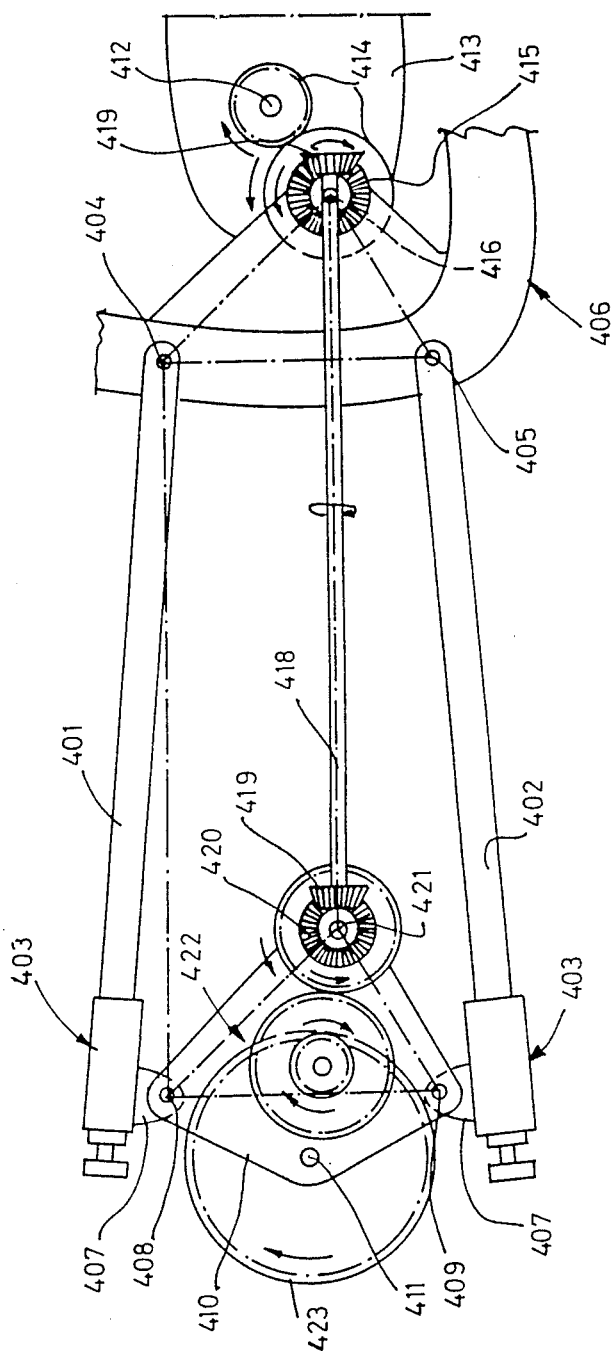
FIG. 22 is a similar view, though with a rigid shaft transmission.

The improvements according to the version shown in FIGS. 21 and 22 of the drawings comprise a swinging ensemble in the shape of an articulated paralellogram consisting of two longitudinal arms 401, 402 formed with conventional devices, generally denoted with 403, for adjusting the length of the arms. These arms, straight and provided with the adjusting devices 403 in the instant example, may have whatever other shape, for example elbowed or curved shape, to match, in every case, the features of the motorcycle.

The arms 401, 402 have an end which is jointed at points 404, 405 to the motorcycle frame 406. The opposite ends of these arms are formed with lugs 407 to be jointed at points 408, 409 to a support 410 upon which the axle 411 of the motorcycle driving wheel is mounted.

The output shaft 412 of the gearbox 413 is connected to a conventional sprocket transmission 414 which imparts rotation to a sprocket 415, of center line 416, placed at the end of the motorcycle transmission, either chain 417 (FIG. 21) or rigid shaft 418 with terminal sprockets 419 (FIG. 22).

The other terminal sprocket 420 of transmission 417 or 418, which revolves about a center line 421, is connected to a conventional transmission 422 imparting rotation to the crown 423 mounted on the axle 411 of the driving wheel.

Looking to the drawings, it will be appreciated that, either in the version of FIG. 21 or in the version of FIG. 22, the jointing points 404, 405 of arms 401, 402 to the frame 406, and the center line 416 of the sprocket 415 located at one end of the transmission 417 or 418, constitute the apices of a virtual triangle which is identical to the triangle as defined by the jointing points 408, 409 of arms 401, 402 to the support 410, and the center line 421 of the sprocket 420 placed at the rear part of the transmission 417 or 418.

This is so whichever the composition of the transmissions 414 and 422 may be. What is important is the identity of the triangles and the constant distance between the center lines 416 and 421 and the points 404 and 405 on the one hand and the points 408 and 409 on the other. Accordingly, the movements of the swinging ensemble do not alter the distance between the fundamental points of the motorcycle transmission, such as the center lines 416, 421.

It may be emphasized that, as in the preceding embodiments, the jointing points 404, 405 and 408, 409 define an articulated parallelogram regardless of the shape of the arms 401, 402 and of the embodying of lugs 407 or complementary parts thereto.

Also, the above improvements are likewise applicable to the swinging ensembles comprising more than one articulated parallelogram, regardless of the position in which the arms 401, 402 are placed as regards the transmission 418 or 418.

The improvements are also applicable to those swinging ensembles in which the arms 401, 402 are connected with one another by means of transverse struts in turn connected to the piece supporting the driving wheel axle.

I claim:

1. A rear wheel suspension mechanism for motorcycles and like vehicles which have a rear-wheel drive including a first sprocket coupled to the rear drive wheel for rotation about a first axis, a second sprocket mounted at a gear box output for rotation about a second axis, and transmission means for coupling said first and second sprockets, said rear wheel suspension means comprising:
   - at least two oscillating arms extending substantially longitudinally relative to the motorcycle traveling direction;
   - an oscillating axle support articulated to a first end of each of said oscillating arms at respective first joints;
   - an axle for the rear driving wheel mounted in the oscillating support and coupled to the first sprocket;
   - second ends of the oscillating arms opposite the first ends thereof being articulated to respective points of a motorcycle frame at respective second joints;
   - such that the oscillating arms constitute, together with the rear wheel axle oscillating support, an oscillating ensemble, said first and second joints defining the shape of an articulated polygon; and
   - wherein two of said first and second joints defining the articulated polygon are movable while maintaining said first and second ends of said arms articulated to said axle support and motorcycle frame respectively to provide for continuous adjustment of the distance between said first and second joints formed by each of said oscillating arms.

2. The mechanism of claim 1, wherein said two movable joints comprise said first joints.

3. The mechanism of claim 1 wherein said transmission means comprises a transmission chain for transmitting motion from the second sprocket at the gear box output to the first sprocket at the rear drive wheel.

4. The mechanism of claim 1 wherein said transmission means comprises an intermediate gear arrangement for transmitting motion from the second sprocket at the gear box output to the first sprocket at the rear drive wheel.

5. A rear wheel suspension mechanism for motorcycles and like vehicles which have a rear-wheel drive including a first sprocket coupled to the rear drive wheel for rotation about a first axis, a second sprocket mounted at a gear box output for rotation about a second axis, and transmission means for coupling said first and second sprockets, said rear wheel suspension means comprising:
   - at least two oscillating arms extending substantially longitudinally relative to the motorcycle traveling direction;
   - an oscillating axle support articulated to a first end of each of said oscillating arms at respective first joints;
   - an axle for the rear driving wheel mounted in the oscillating support and coupled to the first sprocket;
   - second ends of the oscillating arms opposite the first ends thereof being articulated to respective points of a motorcycle frame at respective second joints;
   - such that the oscillating arms constitute, together with the rear wheel axle oscillating support, an oscillating ensemble, said first and second joints defining the shape of an articulated polygon; and
   - wherein said first joints and said first sprocket axis of rotation constitute apices of a first virtual triangle, and said second joints and said second sprocket axis of rotation constitute apices of a second virtual triangle, and wherein said first and second virtual triangles are substantially congruent and have orientations which are substantially the same as each other at all times.

6. The mechanism of claim 5 wherein said transmission means comprises a transmission chain for transmitting motion from the second sprocket at the gear box output to the first sprocket at the rear drive wheel.

7. The mechanism of claim 5 wherein said transmission means comprises an intermediate gear arrangement for transmitting motion from the second sprocket at the gear box output to the first sprocket at the rear drive wheel.

8. A rear wheel suspension mechanism for motorcycles and like vehicles which have a rear-wheel drive including a first sprocket coupled to the rear drive wheel for rotation about a first axis, a second sprocket mounted at a gear box output for rotation about a second axis, and transmission means for coupling said first and second sprockets, said rear wheel suspension means comprising:
   - at least two oscillating arms extending substantially longitudinally relative to the motorcycle traveling direction;
   - an oscillating axle support articulated to a first end of each of said oscillating arms at respective first joints;
   - an axle for the rear driving wheel mounted in the oscillating support and coupled to the first sprocket;
   - second ends of the oscillating arms opposite the first ends thereof being articulated to respective points of a motorcycle frame at respective second joints;
   - such that the oscillating arms constitute, together with the rear wheel axle oscillating support, an oscillating ensemble, said first and second joints defining the shape of an articulated polygon; and
   - wherein at least the oscillating arms of the articulated polygon constituting the oscillating ensemble, are formed of at least two mutually extensible and adjustable sections with means for adjusting and securing desired mutual position.

9. A rear wheel suspension mechanism for motorcycles and like vehicles which have a rear-wheel drive including a first sprocket coupled to the rear drive wheel for rotation about a first axis, a second sprocket mounted at a gear box output for rotation about a second axis, and transmission means for coupling said first and second sprockets, said rear wheel suspension means comprising:

at least two oscillating arms extending substantially longitudinally relative to the motorcycle traveling direction;

an oscillating axle support articulated to a first end of each of said oscillating arms at respective first joints;

an axle for the rear driving wheel mounted in the oscillating support and coupled to the first sprocket;

second ends of the oscillating arms opposite the first ends thereof being articulated to respective points of a motorcycle frame at respective second joints;

such that the oscillating arms constitute, together with the rear wheel axle oscillating support, an oscillating ensemble, said first and second joints defining the shape of an articulated polygon; and wherein said oscillating axle support comprises a crank arm and said second joints are situated over and under the first sprocket axis of rotation respectively; and wherein said first joints and said first sprocket axis of rotation constitute apices of a first virtual triangle, and said second joints and said second sprocket axis of rotation constitute apices of a second virtual triangle, and wherein said first and second virtual triangles are substantially congruent and have orientations which are substantially the same as each other at all times.

10. The mechanism of claim 9, wherein a line joining the first joints is at all times substantially parallel to a line joining the second joints.

11. A rear wheel suspension mechanism for motorcycles and like vehicles which have a rear-wheel drive including a first sprocket coupled to the rear drive wheel for rotation about a first axis, a second sprocket mounted at a gear box output for rotation about a second axis, and transmission means for coupling said first and second sprockets, said rear wheel suspension means comprising:

at least two oscillating arms extending substantially longitudinally relative to the motorcycle traveling direction;

an oscillating axle support articulated to a first end of each of said oscillating arms at respective first joints;

an axle for the rear driving wheel mounted in the oscillating support and coupled to the first sprocket;

second ends of the oscillating arms opposite the first ends thereof being articulated to respective points of a motorcycle frame at respective second joints;

such that the oscillating arms constitute, together with the rear wheel axle oscillating support, an oscillating ensemble, said first and second joints defining the shape of an articulated polygon; and wherein the ends of the oscillating arms articulated to the oscillating support are also connected within respective bushings having screws which are operable from the outside to regulate the extension of the respective arms and secure an assumed position, with the cooperation of safety nuts whereby tensioning of the transmission means is controlled.

* * * * *